United States Patent
Orr et al.

(10) Patent No.: US 6,645,113 B2
(45) Date of Patent: Nov. 11, 2003

(54) DIFFERENTIAL GEAR RETENTION SYSTEM

(75) Inventors: Brian C. Orr, Macomb, MI (US); John E. Rutt, Macomb Township, MI (US); Richard M. Krzesicki, Ann Arbor, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/967,257

(22) Filed: Sep. 28, 2001

(65) Prior Publication Data

US 2003/0064851 A1 Apr. 3, 2003

(51) Int. Cl.[7] ............................................. F16H 48/06
(52) U.S. Cl. ....................... 475/230; 475/231; 475/336; 74/423
(58) Field of Search .................. 475/230, 231, 475/336; 74/423; 403/315, 316, 317, 318, 319

(56) References Cited

U.S. PATENT DOCUMENTS

| | | | |
|---|---|---|---|
| 1,115,536 A | | 11/1914 | Hinkley |
| 1,987,716 A | * | 1/1935 | Skelton ..................... 475/230 |
| 2,408,926 A | | 10/1946 | Griffith |
| 2,548,258 A | | 4/1951 | Griffith |
| 3,146,010 A | * | 8/1964 | Dellith ..................... 248/27.1 |
| 3,384,393 A | * | 5/1968 | Horton et al. ............. 174/65 R |
| 3,527,120 A | | 9/1970 | Duer et al. |
| 3,709,530 A | * | 1/1973 | Redding ..................... 403/360 |
| 4,084,450 A | | 4/1978 | Conroy |
| 5,101,681 A | * | 4/1992 | Shpigel ..................... 403/57 |
| 5,131,894 A | | 7/1992 | Hilker |
| 5,480,360 A | * | 1/1996 | Patzer et al. .............. 475/230 |
| 5,509,862 A | | 4/1996 | Sherman |
| 5,620,388 A | | 4/1997 | Schlegelmann et al. |
| 5,951,431 A | * | 9/1999 | Downs et al. .............. 475/230 |
| 6,010,424 A | * | 1/2000 | Irwin ....................... 475/231 |
| 6,398,689 B1 | * | 6/2002 | Morse et al. ............... 384/583 |
| 6,436,002 B1 | * | 8/2002 | Ishikawa et al. ............ 475/231 |
| 6,450,914 B1 | * | 9/2002 | Irwin et al. ................ 475/230 |

FOREIGN PATENT DOCUMENTS

| | | |
|---|---|---|
| DE | 39 26 878 A1 | 3/1990 |
| EP | 0 489 272 A1 | 6/1992 |
| EP | 0 730 109 A1 | 9/1996 |
| FR | 1198091 | 12/1959 |

* cited by examiner

*Primary Examiner*—Rodney H. Bonck
*Assistant Examiner*—David D. Le
(74) *Attorney, Agent, or Firm*—Brinks Hofer Gilson & Lione

(57) ABSTRACT

A differential gear assembly for an automobile includes an annular ring gear, a differential case, a pair of side gears substantially axially aligned and spaced apart from each other and adapted to be supported by the differential case and to engage an axle shaft of the automobile, and a pair of differential pinion gears substantially axially aligned and spaced apart from each other, and adapted to engage the side gears. A differential pin is secured to and extends diametrically across the ring gear and is adapted to support the differential pinion gears in engagement with the side gears and to allow rotational movement of the differential pinion gears about the differential pin.

5 Claims, 1 Drawing Sheet

DIFFERENTIAL GEAR RETENTION SYSTEM

TECHNICAL FIELD OF THE INVENTION

The present invention generally relates to a differential gear assembly in which the differential pinion gears are supported by the differential pin.

BACKGROUND OF THE INVENTION

Conventionally, vehicle differential gear assemblies transfer rotational torque from a rotary drive member such as the output shaft of a transmission to a pair of substantially axially-aligned spaced-apart axle shafts having a wheel mounted on their respective ends. Traditionally, this torque is transferred through a pair of differential pinion gears which are supported by a differential case. The differential case must be structurally designed to support the differential pinions gears which adds size and weight to the differential assembly. Since size and weight are typically disadvantageous in a vehicle, there is a need in the industry for a differential gear with a smaller and lighter design.

DETAILED DESCRIPTION OF THE INVENTION

The following description of the preferred embodiment of the invention is not intended to limit the scope of the invention to this preferred embodiment, but rather to enable any person skilled in the art to make and use the invention.

Figure 1:
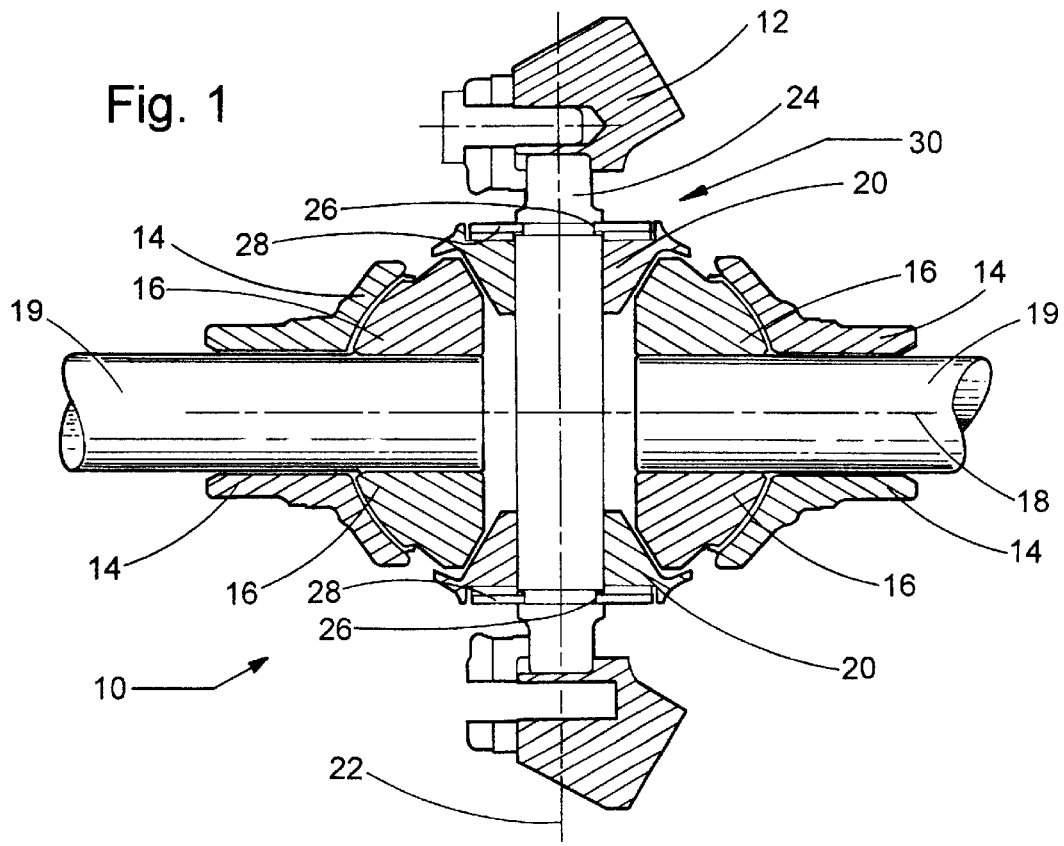
FIG. 1 is a sectional view of a differential assembly of the present invention.

Referring to FIG. 1, a differential gear assembly of the present invention is generally shown at 10. The assembly 10 includes an annular ring gear 12 having an internal surface and an external surface. The ring gear 12 is mounted onto a differential case 14 and is adapted to engage a drive shaft of an automobile to transfer torque from a transmission of the automobile to the differential assembly 10. Supported within the differential case 14 is a pair of side gears 16. The side gears 16 are substantially axially aligned and are spaced apart from each other along a first axis 18. Each of the side gears 16 is adapted to be supported by the differential case 14 and to engage an axle shaft 19 of the automobile to transfer torque to the drive wheels (not shown) of the automobile.

A pair of differential pinion gears 20 are also mounted within the differential assembly 10. The pinion gears 20 are substantially axially aligned and spaced apart from each other along a second axis 22 which is perpendicular to the first axis 18. Each of the differential pinion gears 20 is adapted to engage the side gears 16. A differential pin 24 is secured to and extends diametrically across the ring gear 12. The differential pin 24 is adapted to support the differential pinion gears 20 in engagement with the side gears 16 of the differential assembly 10. The differential pin 24 also includes a smooth outer surface to allow rotational movement of the differential pinion gears 20 about the differential pin 24. The differential pinion gears 20 include a smooth inner surface to allow the differential pinion gears 20 to rotate about the smooth surface of the differential pin 24. Alternatively, the differential pinion gears 20 could be supported on the differential pin 24 by bearings (not shown).

The differential pin 24 is supported at each end by the ring gear 12. The differential pin 24 can be mounted to the ring gear 12 by any appropriate methods.

The differential pin 24 includes a first end and a second end. Additionally, the differential pin 24 preferably includes slots 26 formed within the side of the differential pin 24 adjacent each of the first and second ends. A clip 28 is adapted to engage the slots 26 at either end of the differential pin 24 to securely mount onto the differential pin 24. The clips 28 provide support for the differential pinion gears 20 to keep the differential pinion gears 20 held in engagement with the side gears 16.

The clips 28 of the present invention provide support to the differential pinion gears 20 directly from the differential pin 24. This allows the differential case 14 to be designed without features adapted to provide support to the differential pinion gears 20, which ultimately leads to the ability to use a lighter and smaller differential case 14.

Figure 2:
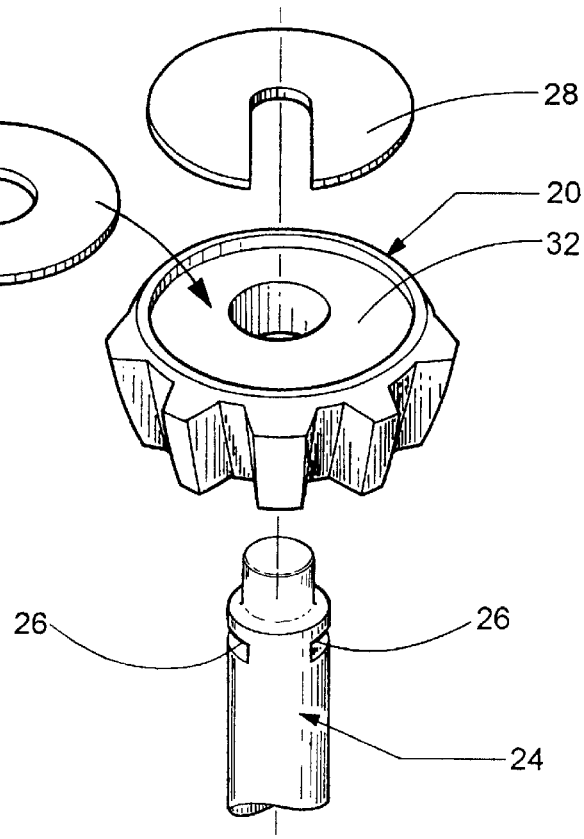
FIG. 2 is an exploded view of a differential pin, differential pinion gear, full washer and C-washer of the differential assembly.

Referring to FIG. 2, in the preferred embodiment, each end of the differential pin 24 includes a pair of slots 26 aligned with one another and formed on opposite sides of the differential pin 24. Preferably, the clips 28 are C-washers which are adapted to be received within the slots 26. The slots 26 will provide solid axial support for the C-washers 28 while also providing rotational support to keep the C-washers 28 from rotating about the differential pin 24. Additionally, slots 26 on opposing sides of the differential pin 24 do not compromise the structural integrity of the differential pin 24 as much as a slot extending annularly about the differential pin 24.

Preferably, a full washer 30 is mounted between the C-washer 28 and the differential pinion gears 20 at each end of the differential pin 24. The full washers 30 will evenly distribute support to the differential pinion gears 20. Additionally, each of the differential pinion gears 20 includes a pocket 32 formed on a back-side thereof. The pocket 32 is adapted to receive the full washer 30. The presence of the pocket 32 and the full washer 30 helps to evenly distribute the separation loads exerted against the differential pinions gears 20 when the differential assembly 10 is in use. Additionally, the pocket 32 is deep enough such that when the C-washer is placed to the differential pin 24, the pocket 32 will prevent the C-washer 28 from sliding out of the slots 26 and will keep the C-washer 28 mounted onto the differential pin 24.

The thickness of the full washers 30 within the differential assembly 10 can be selected at the time of assembly to minimize the amount of gaps within the assembly 10, thereby minimizing the amount of backlash within the gears 16, 20. This will reduce NVH (noise, vibration, harshness) noise caused by backlash in the differential assembly 10.

The foregoing discussion discloses and describes one preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. A differential gear assembly for an automobile comprising:

an annular ring gear having an internal surface and an external surface;

a differential case;

a pair of side gears substantially axially aligned and spaced apart from each other, each of said side gears adapted to be supported by said differential case and to engage an axle shaft of the automobile;

a pair of differential pinion gears substantially axially aligned and spaced apart from each other, each of said differential pinion gears being adapted to engage said side gears; and a differential pin attached to and extending diametrically across said ring gear, wherein said differential pin is rotatable about a longitudinal axis of said differential pin but is otherwise immobile relative to said ring gear, said differential pin including a first end, a second end, and slots formed within the side of said differential pin adjacent to said first end and said second end, said differential gear assembly further including a pair of clips which are adapted to engage said slots at said first and second ends of said differential pin to rotatably support said differential pinion gears in engagement with said side gears.

2. The differential gear assembly of claim 1 wherein said slots adjacent said first end of said differential pin are aligned with one another and formed on opposite sides of said differential pin and said slots adjacent said second end of said differential pin are aligned with one another and formed on opposite sides of said differential pin.

3. The differential gear assembly of claim 2 wherein said clips are C-washers which are adapted to be received within said slots.

4. The differential gear assembly of claim 1 including a pair of full washers, one of said full washers disposed between each of said clips and said differential pinion gears and adapted to evenly distribute support to said differential pinion gears.

5. The differential gear assembly of claim 4 wherein said differential pinion gears each include a pocket adapted to receive said full washer therein.

* * * * *